US009077058B2

(12) United States Patent
Yang et al.

(10) Patent No.: US 9,077,058 B2
(45) Date of Patent: Jul. 7, 2015

(54) COOLING MEMBER OF COMPACT STRUCTURE AND EXCELLENT STABILITY AND BATTERY MODULE EMPLOYED WITH THE SAME

(71) Applicant: LG CHEM. LTD., Seoul (KR)

(72) Inventors: JaeHun Yang, Daejeon (KR); Jong Moon Yoon, Daejeon (KR); Yong Shik Shin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 13/656,147

(22) Filed: Oct. 19, 2012

(65) Prior Publication Data

US 2013/0045410 A1 Feb. 21, 2013

Related U.S. Application Data

(63) Continuation of application No. PCT/KR2011/003499, filed on May 12, 2011.

(30) Foreign Application Priority Data

May 18, 2010 (KR) .......................... 10-2010-0046200

(51) Int. Cl.
*H01M 10/6557* (2014.01)
*H01M 10/656* (2014.01)
*H01M 10/625* (2014.01)
*H01M 10/647* (2014.01)
*H01M 10/613* (2014.01)

(52) U.S. Cl.
CPC .......... *H01M 10/656* (2015.04); *H01M 10/625* (2015.04); *H01M 10/647* (2015.04); *H01M 10/6557* (2015.04); *H01M 10/613* (2015.04)

(58) Field of Classification Search
None
See application file for complete search history.

(56) References Cited

U.S. PATENT DOCUMENTS

| 5,756,227 A | 5/1998 | Suzuki et al. | |
| 6,512,347 B1 * | 1/2003 | Hellmann et al. | 320/107 |
| 2004/0180257 A1 * | 9/2004 | Kimoto | 429/120 |
| 2007/0018610 A1 * | 1/2007 | Wegner | 320/112 |

(Continued)

FOREIGN PATENT DOCUMENTS

| JP | 8-148187 A | 6/1996 |
| JP | 2004-103258 A | 4/2004 |

(Continued)

OTHER PUBLICATIONS

International Search Report for PCT/KR2011/003499 mailed on Feb. 6, 2012.

*Primary Examiner* — Patrick Ryan
*Assistant Examiner* — Jose Colucci Rios
(74) *Attorney, Agent, or Firm* — Birch, Stewart, Kolasch & Birch, LLP

(57) ABSTRACT

Disclosed herein is a cooling member mounted between battery cells to remove heat generated from the battery cells during charge and discharge of the battery cells, wherein the cooling member includes a plate-shaped heat dissipation fin disposed between the battery cells in a state in which opposite main surfaces of the heat dissipation fin are in tight contact with the battery cells and a coolant conduit configured to have a hollow structure through which a coolant flows, the coolant conduit thermally contacting the heat dissipation fin, the coolant conduit being located at an outside of an electrode assembly receiving part of each of the battery cells when the heat dissipation fin is disposed between the battery cells.

20 Claims, 6 Drawing Sheets

(56) References Cited

U.S. PATENT DOCUMENTS

| | | | |
|---|---|---|---|
| 2007/0240867 A1* | 10/2007 | Amano et al. | 165/168 |
| 2009/0023056 A1* | 1/2009 | Adams et al. | 429/120 |
| 2009/0208829 A1* | 8/2009 | Howard et al. | 429/120 |
| 2009/0253026 A1 | 10/2009 | Gaben | |
| 2009/0258288 A1* | 10/2009 | Weber et al. | 429/120 |
| 2010/0009248 A1* | 1/2010 | Fuhrmann et al. | 429/120 |
| 2011/0052960 A1* | 3/2011 | Kwon et al. | 429/120 |
| 2011/0206966 A1* | 8/2011 | Schmid et al. | 429/120 |

FOREIGN PATENT DOCUMENTS

| | | |
|---|---|---|
| JP | 2009-9889 A | 1/2009 |
| KR | 10-2009-0107443 A | 10/2009 |
| WO | WO 2011/054952 A1 | 5/2011 |

\* cited by examiner

COOLING MEMBER OF COMPACT STRUCTURE AND EXCELLENT STABILITY AND BATTERY MODULE EMPLOYED WITH THE SAME

CROSS REFERENCE TO RELATED APPLICATIONS

This application is a Continuation of PCT International Application No. PCT/KR2011/003499 filed on May 12, 2011, which claims priority under 35 U.S.C. 119(a) to Application No. 10-2010-0046200 filed in Republic of Korea on May 18, 2010, all of which are hereby expressly incorporated by reference into the present application.

TECHNICAL FIELD

The present invention relates to a cooling member of a compact structure and excellent stability and a battery module including the same, and, more particularly, to a cooling member mounted between battery cells to remove heat generated from the battery cells during charge and discharge of the battery cells, wherein the cooling member includes a plate-shaped heat dissipation fin disposed between the battery cells in a state in which opposite main surfaces of the heat dissipation fin are in tight contact with the battery cells and a coolant conduit configured to have a hollow structure through which a coolant flows, the coolant conduit thermally contacting the heat dissipation fin, the coolant conduit being located at an outside of an electrode assembly receiving part of each of the battery cells when the heat dissipation fin is disposed between the battery cells, and a battery module including the same.

BACKGROUND ART

Recently, a secondary battery, which can be charged and discharged, has been widely used as an energy source for wireless mobile devices. Also, the secondary battery has attracted considerable attention as a power source for electric vehicles (EV), hybrid electric vehicles (HEV), and plug-in hybrid electric vehicles (Plug-in HEV), which have been developed to solve problems, such as air pollution, caused by existing gasoline and diesel vehicles using fossil fuels.

Small-sized mobile devices use one or several battery cells for each device. On the other hand, middle or large-sized devices, such as vehicles, use a middle or large-sized battery module having a plurality of battery cells electrically connected to one another because high power and large capacity are necessary for the middle or large-sized devices.

Preferably, the middle or large-sized battery module is manufactured so as to have as small a size and weight as possible. For this reason, a prismatic battery or a pouch-shaped battery, which can be stacked with high integration and has a small weight to capacity ratio, is usually used as a battery cell of the middle or large-sized battery module. In particular, much interest is currently focused on the pouch-shaped battery, which uses an aluminum laminate sheet as a sheathing member, because the pouch-shaped battery is lightweight, the manufacturing costs of the pouch-shaped battery are low, and it is easy to modify the shape of the pouch-shaped battery.

Battery cells constituting such a middle or large-sized battery module are secondary batteries which can be charged and discharged. Consequently, a large amount of heat is generated from the high-power, large-capacity secondary batteries during the charge and discharge of the batteries. In particular, the laminate sheet of each pouch-shaped battery widely used in the battery module has a polymer material exhibiting low thermal conductivity coated on the surface thereof with the result that it is difficult to effectively lower the overall temperature of the battery cells.

If the heat, generated from the battery module during the charge and discharge of the battery module, is not effectively removed from the battery module, the heat accumulates in the battery module with the result that deterioration of the battery module is accelerated. According to circumstances, the battery module may catch fire or explode. For this reason, a cooling system is needed in a middle or large-sized battery pack for vehicles, which is a high-power, large-capacity battery including a plurality of middle or large-sized battery modules, to cool battery cells mounted in the battery pack.

Each battery module mounted in a middle or large-sized battery pack is generally manufactured by stacking a plurality of battery cells with high integration. In this case, the battery cells are stacked in a state in which the battery cells are arranged at predetermined intervals so that heat generated during the charge and discharge of the battery cells is removed. For example, the battery cells may be sequentially stacked in a state in which the battery cells are arranged at predetermined intervals without using an additional member. Alternatively, in a case in which the battery cells have low mechanical strength, one or more battery cells are mounted in a battery cartridge to constitute a unit module, and a plurality of unit modules is stacked to constitute a battery module. The battery cartridge increases the mechanical strength of the battery cells; however, the battery cartridge also increases the overall size of the battery module.

Also, coolant channels are defined between the stacked battery cells or between the stacked battery modules so that heat accumulated between the stacked battery cells or between the stacked battery modules is effectively removed.

In particular, in a case in which the cooling structure is based on a water cooling type cooling system, a plurality of coolant channels is defined between the battery cells or between the battery modules with the result that it is very difficult to design the cooling structure. In addition, if a cooling member or a thermal conduction member is mounted to a specific region of the batter pack to constitute the cooling structure, overall size of the battery pack is increased.

In connection with this case, a cooling member 10 having a structure as shown in FIG. 1 may be considered as the water cooling type cooling member disposed between the battery cells of the battery module. Specifically, the cooling member 10 of FIG. 1 includes a pair of metal sheets 20. Outer edges 30 of the metal sheets 20 are sealed in a state in which coolant channels 25 are continuously formed at the insides of the metal sheets 20.

However, the mechanical strength of the cooling member 10 is not structurally low with the result that, when the thickness of the battery cells is increased in the stacked direction of the battery cells, the coolant channels 25 formed so as to be in tight contact with the battery cells may be clogged or the sealed portions of the cooling member 10 may be separated from each other. Consequently, coolant-tight reliability and cooling efficiency are lowered.

Furthermore, it is necessary for the entirety of the cooling member 10 to have corrosion resistance with the result that the manufacturing costs of the cooling member 10 are increased.

Consequently, there is a high necessity for a cooling member which effectively prevents leakage of a coolant, ensures durability for a long time, and can be manufactured at low costs, and a battery module of excellent safety using the cooling member.

DISCLOSURE

Technical Problem

Therefore, the present invention has been made to solve the above problems, and it is an object of the present invention to provide a cooling member configured to have a structure in which a coolant conduit is coupled to the outside of a heat dissipation fin.

It is another object of the present invention to provide a battery module configured to have a structure in which a coolant conduit is disposed along the outer edge of an electrode assembly receiving part, and therefore, battery cells are fixed, and leakage of a coolant is prevented.

Technical Solution

In accordance with one aspect of the present invention, the above and other objects can be accomplished by the provision of a cooling member mounted between battery cells to remove heat generated from the battery cells during charge and discharge of the battery cells, wherein the cooling member includes a plate-shaped heat dissipation fin disposed between the battery cells in a state in which opposite main surfaces of the heat dissipation fin are in tight contact with the battery cells and a coolant conduit configured to have a hollow structure through which a coolant flows, the coolant conduit thermally contacting the heat dissipation fin, the coolant conduit being located at an outside of an electrode assembly receiving part of each of the battery cells when the heat dissipation fin is disposed between the battery cells.

The coolant conduit is fitted in the heat dissipation fin along the outside of the electrode assembly receiving part. Consequently, it is possible to effectively prevent leakage of the coolant, as previously described. Also, it is possible to prevent the coolant conduit from being clogged or damaged due to stacking of the battery cells. In addition, it is possible to maintain the shape of the cooling member during the use of the cooling member, thereby achieving excellent cooling design reliability. As a result, it is possible to configure a very compact battery module.

Also, corrosion resistance to the coolant is required only with respect to the coolant conduit. That is, it is not necessary to make the heat dissipation fin of a corrosion-resistant material. Consequently, the manufacturing costs of the cooling member are decreased.

Preferably, each of the battery cells is a plate-shaped secondary battery, which has a small thickness and a relatively large width and length such that the total size of the battery module is minimized when the battery cells are stacked to constitute the battery module. A preferred example of such a plate-shaped secondary battery may be a prismatic battery cell or a pouch-shaped battery cell. Preferably, the plate-shaped secondary battery is a pouch-shaped battery cell configured to have a structure in which an electrode assembly of a cathode/separator/anode structure is mounted in an electrode assembly receiving part formed at a battery case formed of a laminate sheet comprising a resin layer and a metal layer, and a sealed portion ('outer edge sealed portion'), sealed by thermal welding, is formed at the outer edge of the electrode assembly receiving part.

The material for the heat dissipation fin is not particularly restricted so long as the heat dissipation fin is formed of a material exhibiting high thermal conductivity to improve cooling efficiency. For example, the heat dissipation fin may be formed of a metallic material exhibiting high thermal conductivity.

Also, the heat dissipation fin is preferably configured to have a structure in which a pair of metal sheets is coupled to each other.

The coolant conduit is formed of a corrosion-resistant material. Consequently, the coolant conduit is prevented from being corroded by the coolant when the coolant flows in the coolant conduit.

In a preferred example, the coolant conduit may be configured so that at least a portion of the coolant conduit is bent so as to correspond to the shape of an outer edge of the electrode assembly receiving part of each of the battery cells. When the cooling member is disposed between the battery cells, therefore, at least a portion of the coolant conduit is positioned adjacent to the electrode assembly receiving part of each of the battery cells, thereby improving cooling efficiency. Also, structural stability of each of the battery cells is improved, and the cooling member is effectively fixed to each of the battery cells.

In the above structure, the coolant conduit may be variously formed so as to correspond to the shape of the electrode assembly receiving part of each of the battery cells. For example, when the electrode assembly receiving part of each of the battery cells is formed in a quadrangular shape in plan, the coolant conduit may be bent so as to have a shape corresponding to two or more sides of the electrode assembly receiving part. Preferably, the coolant conduit is bent so as to have a shape corresponding to three sides of the electrode assembly receiving part.

In another preferred example, the coolant conduit may be bent so as to be disposed in tight contact with the outer edge of the electrode assembly receiving part.

That is, when the cooling member is disposed between the battery cells, the heat dissipation fin and the coolant conduit can be disposed in tight contact with the outer edge of the electrode assembly receiving part, thereby maximizing heat dissipation through thermal conduction. Also, the cooling member is effectively fixed by the coolant conduit bent along the outer edge of the electrode assembly receiving part to increase supporting force of the battery cells. Consequently, it is not necessary to use additional members to fix the battery cells or it is possible to minimize the use of such additional members.

The coolant conduit may be configured, for example, so that a coolant inlet port and a coolant outlet port of the coolant conduit are formed at one side of the heat dissipation fin side by side. Preferably, the coolant inlet port and the coolant outlet port of the coolant conduit extend from the outer edge of the electrode assembly receiving part.

In the structure in which the coolant inlet port and the coolant outlet port of the coolant conduit are formed at one side of the heat dissipation fin side by side, a coolant introduction and discharge structure is formed at one side of the battery module as compared with a structure in which the coolant inlet port and the coolant outlet port of the coolant conduit are formed at different sides of the heat dissipation fin. Consequently, it is possible to manufacture a more compact battery module and to greatly improve efficiency of a package during configuration of a battery pack.

Meanwhile, the coolant conduit may be coupled to the heat dissipation fin by welding, preferably blazing.

In another preferred example, the heat dissipation fin may be configured to have a structure in which a pair of metal sheets is coupled to each other, and the coolant conduit may be coupled to the heat dissipation fin in a state in which the coolant conduit is disposed between the metal sheets.

In the cooling member with the above structure, the coolant conduit, formed of a corrosion-resistant material, is coupled to the heat dissipation fin, and therefore, it is possible to configure the cooling member so that the cooling member is more compact while minimizing a problem of leakage of the coolant.

Meanwhile, the coolant is not particularly restricted so long as the coolant exhibits high cooling efficiency while easily flowing in the coolant conduit. For example, the coolant may be water, which contains high latent heat, thereby maximizing cooling efficiency.

In accordance with another aspect of the present invention, there is provided a battery module including a cooling member mounted between battery cells.

The battery module according to the present invention may be configured to have a structure in which two or more plate-shaped battery cells are stacked, and the cooling member is disposed between the battery cells. Consequently, it is possible to greatly improve design reliability and cooling efficiency by the provision of a heat dissipation fin and a coolant conduit of the cooling member and to configure the battery module so that the battery module has a compact structure.

The coolant conduit may be configured so that a coolant inlet port and a coolant outlet port of the coolant conduit are formed, preferably, at a region corresponding to electrode terminals of each of the battery cells. Consequently, it is possible to maximize cooling efficiency with respect to the electrode terminals, which are regions of each of the battery cells from which a large amount of heat is generated.

According to circumstances, the coolant conduit may be configured so that the coolant inlet port and the coolant outlet port of the coolant conduit are formed at a region opposite to electrode terminals of each of the battery cells so that the coolant inlet port and the coolant outlet port do not structurally interfere with electrode leads of each of the battery cells.

The battery module according to the present invention includes a plurality of battery cells in order to provide high power and large capacity. Consequently, the battery module is preferably used as a power source for an electric vehicle, a hybrid electric vehicle, a plug-in hybrid electric vehicle, or a power storage device in which high-temperature heat generated during charge and discharge of the battery cells is a serious safety concern.

DESCRIPTION OF DRAWINGS

The above and other objects, features and other advantages of the present invention will be more clearly understood from the following detailed description taken in conjunction with the accompanying drawings, in which.

BEST MODE

Now, preferred embodiments of the present invention will be described in detail with reference to the accompanying drawings. It should be noted, however, that the scope of the present invention is not limited by the illustrated embodiments.

Figure 1:
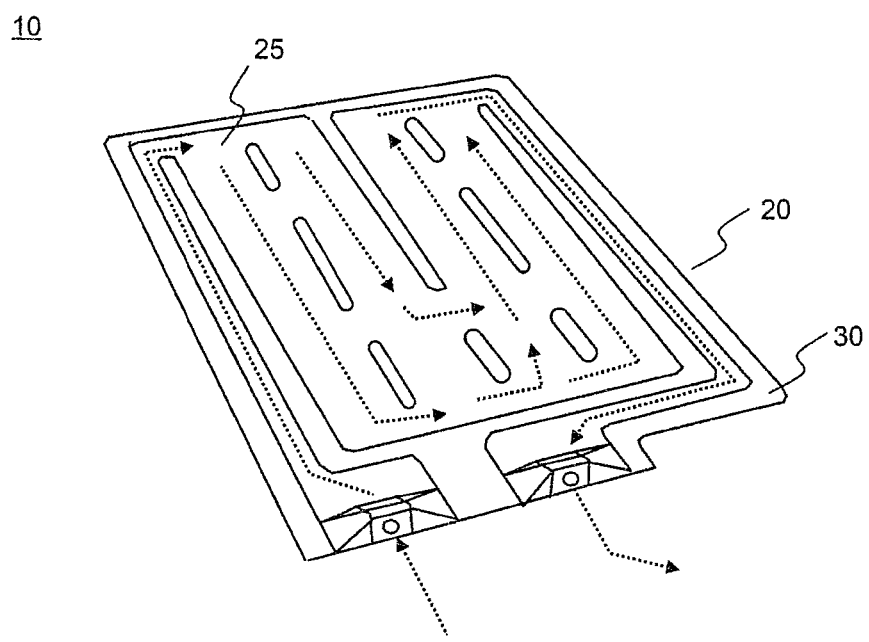
FIG. 1 is a typical view showing an illustrative cooling member.
Figure 2:
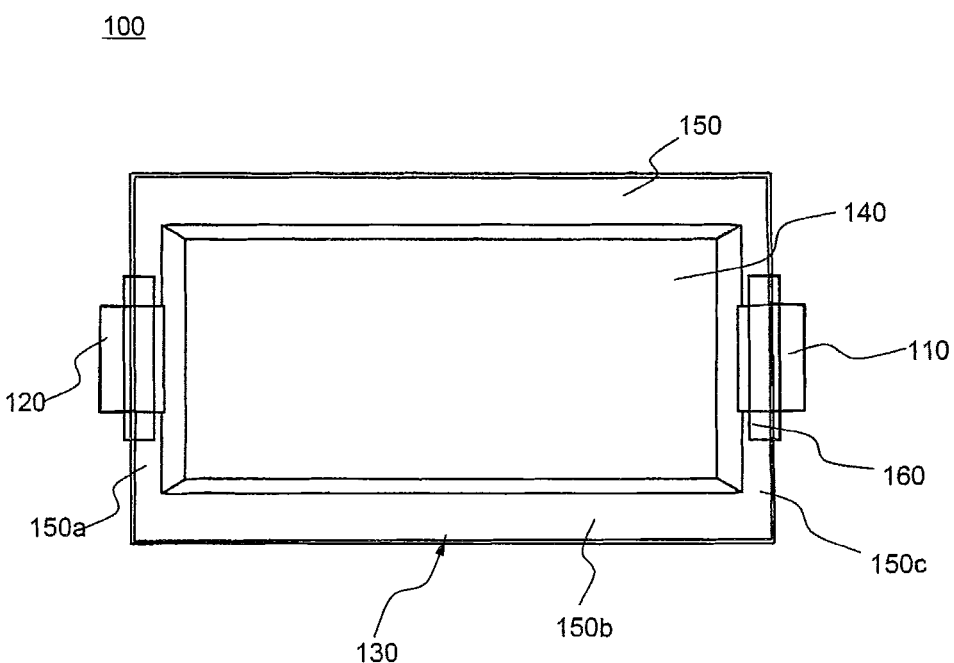
FIG. 2 is a perspective view showing an illustrative plate-shaped battery cell.

FIG. 2 is a perspective view typically showing an illustrative plate-shaped battery cell mounted in a battery module according to the present invention.

Referring to FIG. 2, a plate-shaped battery cell 100 is configured to have a structure in which two electrode leads 110 and 120 protrude from the upper end and the lower end of a battery case 130 in a state in which electrode leads 110 and 120 are opposite to each other.

The battery case 130 is formed of a laminate sheet including a metal layer and a resin layer. The battery case 130 includes an upper case and a lower case. In a state in which an electrode assembly (not shown) of a cathode/separator/anode structure is mounted in an electrode assembly receiving part 140 formed in the battery case 130, outer edges, i.e. lateral sides 150b, an upper end 150a, and a lower end 150c, of the electrode assembly receiving part 140 are sealed by thermal welding to form a sealing portion 150. In this way, the battery cell 100 is manufactured.

The electrode leads 110 and 120 protrude from the upper end 150a and the lower end 150c, respectively. For this reason, the upper end 150a and the lower end 150c of the upper and lower cases of the battery case 130 are thermally welded to each other, in a state in which a film type sealing member 160 is interposed between the electrode leads 110 and 120 and the battery case 130, in consideration of the thickness of the electrode leads 110 and 120 and the difference in material between the electrode leads 110 and 120 and the battery case 130, so as to increase sealability of the battery case 130.

Figure 3:
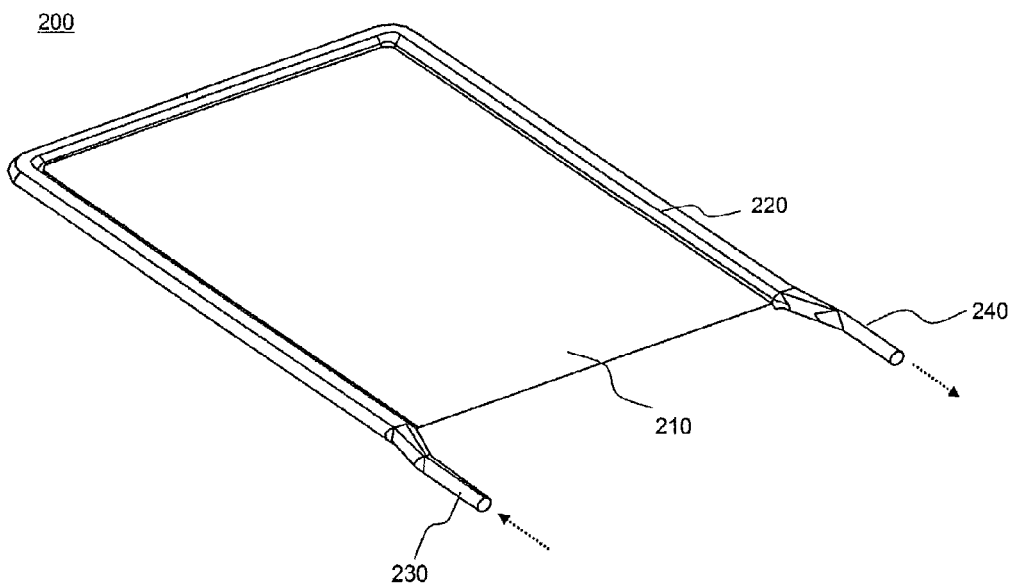
FIG. 3 is a typical view showing a cooling member according to an embodiment of the present invention.
Figure 4:
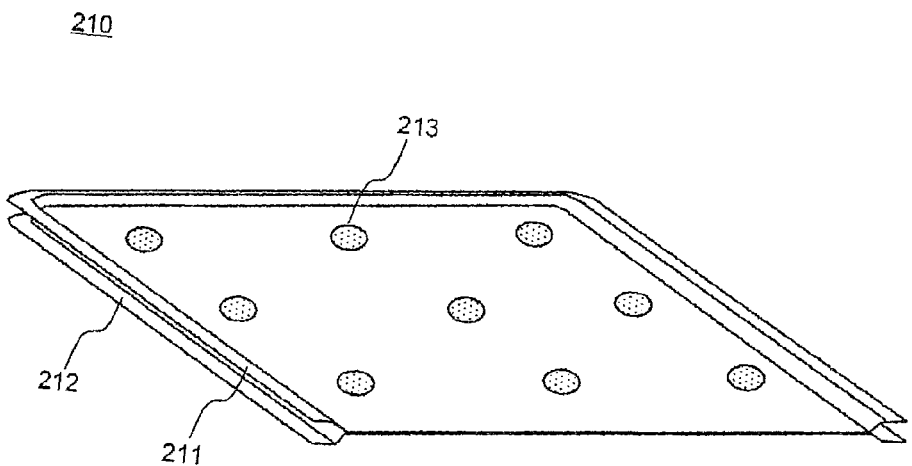
FIG. 4 is a typical view showing a cooling fin of the cooling member shown in FIG. 3.
Figure 5:
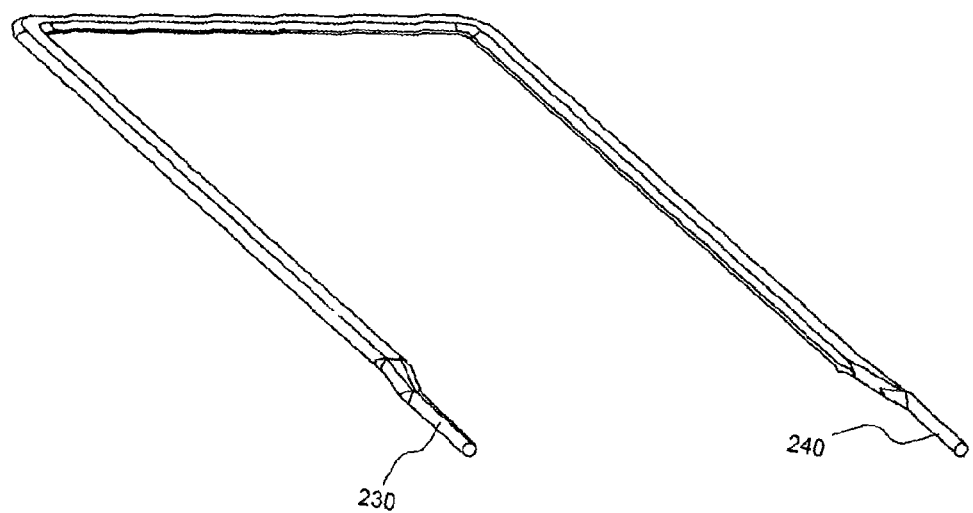
FIG. 5 is a typical view showing a coolant conduit of the cooling member shown in FIG. 3.

FIG. 3 is a perspective view typically showing a cooling member according to an embodiment of the present invention, FIG. 4 is a perspective view typically showing a heat dissipation fin of FIG. 3, and FIG. 5 is a perspective view typically showing a coolant conduit of FIG. 3.

Referring to these drawings together with FIG. 2, the cooling member 200 includes a plate-shaped heat dissipation fin 210, which is made of a metallic material, and a coolant conduit 220 located at the outer edge 150 of the electrode assembly receiving part of the battery cell 100 and configured to have a hollow structure through which a coolant flows.

The heat dissipation fin 210 is formed by coupling a pair of metal sheets 211 and 212 by welding 213. The coolant conduit 220 is bent in a shape corresponding to three sides of the electrode assembly receiving part and is fitted in the heat dissipation fin 210. Consequently, it is possible to prevent the coolant conduit 220 from being clogged or damaged due to stacking of the battery cells.

Also, the coolant conduit 220 is made of a material exhibiting corrosion resistance, and therefore, it is possible to minimize damage to the coolant conduit 220 due to leakage of the coolant.

Figure 6:
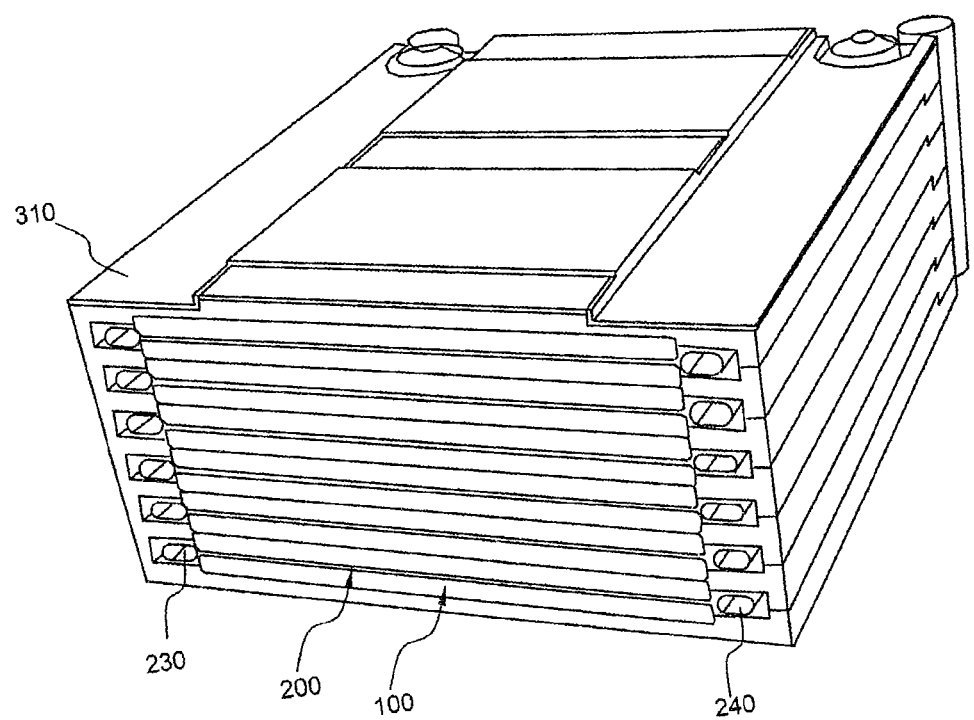
FIG. 6 is a perspective view showing a battery module according to an embodiment of the present invention.
Figure 7:
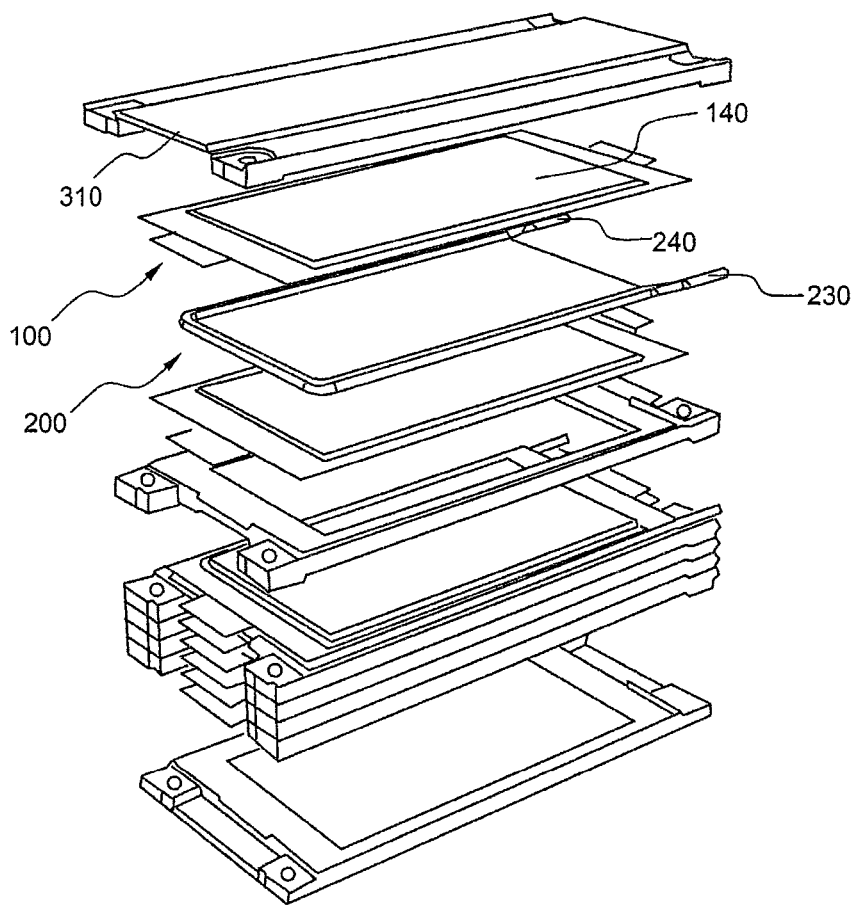
FIG. 7 is an exploded view of the battery module shown in FIG. 6.

FIG. 6 is a perspective view typically showing a battery module according to an embodiment of the present invention, and FIG. 7 is an exploded view typically showing the battery module of FIG. 6.

Referring to these drawings together with FIGS. 2 and 3, cooling members 200 are mounted between corresponding battery cells 100.

A battery module 300 includes a plurality of battery cells 100, a plurality of module cases 310 arranged vertically so that electrode assembly receiving parts 140 of the respective battery cells 100 are adjacent to one another, and a plurality of cooling members 200 disposed at interfaces between the respective battery cells 100.

A heat dissipation fin 210 of each of the cooling members 200 is disposed between the adjacent electrode assembly receiving parts 140 in a tight contact state. A coolant conduit 220, made of a metal sheet, is bent so that the coolant conduit 220 can be disposed in tight contact with the outer edge 150 of the electrode assembly receiving part. Consequently, the coolant conduit 220 has high mechanical strength and is configured to have an overall compact structure.

A coolant inlet port 230 and a coolant outlet port 240 of each of the cooling members 200 disposed between the respective battery cells 100 are directed in the same direction. Consequently, it is possible to easily achieve a piping design for coolant introduction and discharge and to minimize the overall volume of the battery module.

Accordingly, the coolant, flowing along the coolant conduit 220, effectively removes heat conducted to the heat dissipation fin 210 mounted at the interface between the respective battery cells 100 to cool the respective battery cells 100, thereby providing high cooling efficiency. In addition, the battery module 300 is configured so that the battery module 300 has a compact structure although the battery module 300 provides such high cooling efficiency.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, the cooling member according to the present invention is configured to have a structure in which the coolant conduit, which is formed along the outer edge of the electrode assembly receiving part, is coupled to the heat dissipation fin. Consequently, it is possible to solve a problem of leakage of a coolant while fixing the battery cells during configuration of a battery module. Also, it is possible to provide a battery module having a compact structure. In addition, corrosion resistance to the coolant is required only with respect to a specific component of the cooling member, and therefore, the overall manufacturing costs of the battery module are decreased.

The invention claimed is:

1. A cooling member mounted between battery cells to remove heat generated from the battery cells during charge and discharge of the battery cells, wherein the cooling member comprises:
   a plate-shaped heat dissipation fin disposed between the battery cells in a state in which opposite main surfaces of the heat dissipation fin are in tight contact with the battery cells; and
   a coolant conduit configured to have a hollow structure through which a coolant flows, the coolant conduit extending around and contacting at least three edges of the heat dissipation fin, the coolant conduit being located at an outside of an electrode assembly receiving part of each of the battery cells when the heat dissipation fin is disposed between the battery cells,
   wherein the electrode assembly receiving part of each of the battery cells is formed in a quadrangular shape in plan, and the coolant conduit is bent so as to be disposed in tight contact with the outer edge of the electrode assembly receiving part, and
   wherein each of the battery cells is a plate-shaped secondary battery.

2. The cooling member according to claim 1, wherein the plate-shaped secondary battery is a pouch-shaped battery cell configured to have a structure in which an electrode assembly of a cathode/separator/anode structure is mounted in a battery case formed of a laminate sheet comprising a resin layer and a metal layer.

3. The cooling member according to claim 1, wherein the heat dissipation fin is formed of a thermally conductive sheet.

4. The cooling member according to claim 3, wherein the heat dissipation fin is formed of a metal sheet.

5. The cooling member according to claim 4, wherein the heat dissipation fin is configured to have a structure in which a pair of metal sheets is coupled to each other.

6. The cooling member according to claim 1, wherein the coolant conduit is formed of a corrosion-resistant material.

7. The cooling member according to claim 1, wherein the coolant conduit is configured so that a coolant inlet port and a coolant outlet port of the coolant conduit are formed at one side of the heat dissipation fin side by side.

8. The cooling member according to claim 1, wherein the coolant conduit is coupled to the heat dissipation fin by blazing.

9. The cooling member according to claim 1, wherein the heat dissipation fin is configured to have a structure in which a pair of metal sheets is coupled to each other, and the coolant conduit is coupled to the heat dissipation fin in a state in which the coolant conduit is disposed between the metal sheets.

10. The cooling member according to claim 1, wherein the coolant is water.

11. A battery module comprising a cooling member according to claim 1.

12. The battery module according to claim 11, wherein the battery module is configured to have a structure in which two or more plate-shaped battery cells are stacked, and the cooling member is disposed between the battery cells.

13. The battery module according to claim 12, wherein a coolant conduit is configured so that a coolant inlet port and a coolant outlet port of the coolant conduit are formed at a region corresponding to electrode terminals of each of the battery cells.

14. The battery module according to claim 12, wherein a coolant conduit is configured so that a coolant inlet port and a coolant outlet port of the coolant conduit are formed at a region opposite to electrode terminals of each of the battery cells.

15. The battery module according to claim 11, wherein the battery module is used in an electric vehicle, a hybrid electric vehicle, a plug-in hybrid electric vehicle, or a power storage device.

16. A battery module, comprising:
   a first battery cell and a second battery cell;
   a heat dissipating member, the heat dissipation member formed by a sheet having a first major surface and a second major surface opposite the first major surface, the first major surface contacting the first battery cell and the second major surface contacting the second battery cell; and
   a cooling conduit extending outwardly about at least three edges of the heat dissipation member, the cooling conduit having an inlet and an outlet for a cooling fluid, a diameter of the cooling conduit being greater than a thickness of the heat dissipating member.

17. The battery module of claim 16, further comprising:
a channel formed along the edge of the heat dissipation member, the channel retaining the cooling conduit.

18. The battery module of claim 16, wherein the cooling conduit extends about a plurality of sides of the heat dissipating member.

19. The cooling member according to claim 1, wherein the heat dissipation fin is formed by two metal sheets contacting one another, the edges of the two metal sheets spaced from one another to form a channel retaining the cooling conduit.

20. The battery module of claim 16, further comprising a channel formed along the edge of the heat dissipation member,
   wherein the heat dissipation member is formed by two metal sheets contacting one another, the edges of the two metal sheets spaced from one another to form the channel retaining the cooling conduit.

* * * * *